US012759546B2

(12) United States Patent
Kawashima

(10) Patent No.: US 12,759,546 B2
(45) Date of Patent: Oct. 13, 2026

(54) VEHICLE CONTROL DEVICE

(71) Applicant: TOYOTA JIDOSHA KABUSHIKI KAISHA, Toyota (JP)

(72) Inventor: Wataru Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/653,021

(22) Filed: May 2, 2024

(65) Prior Publication Data

US 2024/0375650 A1 Nov. 14, 2024

(30) Foreign Application Priority Data

May 12, 2023 (JP) ................................ 2023-079559

(51) Int. Cl.
*B60W 30/00* (2006.01)
*B60W 30/12* (2020.01)
*B62D 15/02* (2006.01)

(52) U.S. Cl.
CPC ......... *B60W 30/12* (2013.01); *B60W 2420/40* (2013.01); *B60W 2720/24* (2013.01); *B62D 15/0265* (2013.01)

(58) Field of Classification Search
CPC .......................... B60W 30/12; B62D 15/0265
See application file for complete search history.

(56) References Cited

U.S. PATENT DOCUMENTS 8,504,233 B1 * 8/2013 Ferguson ............ G05D 1/0212 340/463
9,809,219 B2 * 11/2017 Agnew ................ B60W 30/09
11,335,134 B2 * 5/2022 Sato .................. B62D 15/0265
11,377,145 B2 * 7/2022 Ozawa .................. B62D 6/002
11,396,291 B2 * 7/2022 Kobayashi ........... B60W 30/12
11,465,646 B2 * 10/2022 Oyama ............ B60W 60/0053
11,498,617 B2 * 11/2022 Akamatsu ............ B60W 30/12
11,958,484 B2 * 4/2024 Brandin ............... B60W 30/12
12,214,823 B2 * 2/2025 Takahashi ............ B60W 30/12
(Continued)

FOREIGN PATENT DOCUMENTS

JP 2017-224163 A 12/2017
JP 6365672 B2 8/2018
(Continued)

*Primary Examiner* — Logan M Kraft
*Assistant Examiner* — Sherman D Manley
(74) *Attorney, Agent, or Firm* — Dickinson Wright, PLLC

(57) ABSTRACT

A vehicle control device includes a determination unit that determines, based on the detection results of sensor that acquire the surrounding environment of the host vehicle, whether obstacles and traveling other vehicles exist in the adjacent lane adjacent to one side in the vehicle-width direction of an own lane in which the host vehicle travels, and a travel control unit that, when it is determined by the determination unit that obstacles and traveling other vehicles exist in the adjacent lane, offsets the lateral position of the host vehicle in the own lane to the other side in the vehicle-width direction. The travel control unit adjusts the amount of offset to offset the lateral position of the host vehicle to the other side in the vehicle-width direction according to the road structure on the opposite side of the adjacent lane side.

7 Claims, 3 Drawing Sheets

(56) References Cited

U.S. PATENT DOCUMENTS

| | | | | |
|---|---|---|---|---|
| 2005/0228588 | A1* | 10/2005 | Braeuchle | B62D 15/025 701/41 |
| 2013/0226406 | A1* | 8/2013 | Ueda | B62D 1/28 701/41 |
| 2017/0269602 | A1* | 9/2017 | Nakamura | B60W 30/09 |
| 2018/0141588 | A1* | 5/2018 | Shimizu | B62D 15/0265 |
| 2019/0217883 | A1* | 7/2019 | Ozawa | B62D 6/002 |
| 2021/0024059 | A1* | 1/2021 | Miyamoto | B60W 30/095 |
| 2021/0263519 | A1* | 8/2021 | Ogino | B60W 60/0015 |
| 2023/0150488 | A1* | 5/2023 | Miyamoto | B60W 10/184 701/41 |
| 2023/0192190 | A1* | 6/2023 | Takahashi | B60W 30/12 701/41 |
| 2024/0025403 | A1* | 1/2024 | Tomioka | B60W 30/12 |
| 2024/0043040 | A1* | 2/2024 | Liu | B60W 30/0956 |
| 2024/0116499 | A1* | 4/2024 | Mori | B60W 30/12 |
| 2024/0132075 | A1* | 4/2024 | Hata | B60W 30/18163 |

FOREIGN PATENT DOCUMENTS

| | | | |
|---|---|---|---|
| JP | 6584509 | B2 | 10/2019 |
| JP | 6592074 | B | 10/2019 |
| JP | 6747079 | B | 8/2020 |
| JP | 2021131775 | A | 9/2021 |
| JP | 2023-059103 | A | 4/2023 |

* cited by examiner

VEHICLE CONTROL DEVICE

TECHNICAL FIELD

The present disclosure relates to a vehicle control device.

BACKGROUND

As a technology related to vehicle control devices, a driving assistance device described in Patent Document 1 is known. In the driving assistance device described in Patent Publication No. 6747079, it is determined whether an obstacle is located in an adjacent lane, and if it is determined that the obstacle is located in the adjacent lane, it is determined whether traveling other vehicles are present in the adjacent lane. If it is determined that an obstacle is located in the adjacent lane and traveling other vehicles are present, the host vehicle is moved to the opposite side of the adjacent lane side.

SUMMARY

In the above technology, as described above, when obstacles and traveling other vehicles exist in the adjacent lane, the lateral position of the host vehicle is offset to the opposite side of the adjacent lane side, aiming to reduce the anxiety of the occupants. However, in this case, the road structure on the opposite side of the adjacent lane side is not considered, and there is room for improvement in reducing the anxiety of the occupants. Therefore, this disclosure explains a vehicle control device that can reduce the anxiety of the occupants.

A vehicle control device according to one aspect of this disclosure includes a determination unit that determines, based on the detection results of sensor that acquire the surrounding environment of a host vehicle, whether or not an obstacle and a traveling other vehicle exists in the adjacent lane adjacent to one side in the vehicle-width direction of an own lane in which the host vehicle travels, and a travel control unit that, when it is determined by the determination unit that the obstacle and the traveling other vehicle exists in the adjacent lane, offsets a lateral position of the host vehicle in the own lane to the other side in the vehicle-width direction. The travel control unit adjusts an amount of offset to offset the lateral position of the host vehicle to the other side in the vehicle-width direction according to the road structure on the opposite side of the adjacent lane side.

In the vehicle control device according to one aspect of this disclosure, the travel control unit may offset the lateral position of the host vehicle to the other side in the vehicle-width direction in the own lane regardless of whether the traveling other vehicle exists in the adjacent lane if there is a blind spot of the sensor in the adjacent lane. In the vehicle control device according to one aspect of this invention, the travel control unit may reduce or set to zero the amount of offset to offset the lateral position of the host vehicle to the other side in the vehicle-width direction if a pedestrian or an another traveling other vehicle exists on the opposite side of the adjacent lane side.

In the vehicle control device according to one aspect of this disclosure, the travel control unit may reduce or set to zero the amount of offset if the road structure on the opposite side of the adjacent lane side is a pedestrian strip with only lane lines or a lane facing the entrance and exit of a building. In the vehicle control device according to one aspect of this invention, the travel control unit may not reduce the amount of offset if the road structure on the opposite side of the adjacent lane side is a sidewalk with curbs.

According to various aspects of this disclosure, it is possible to provide a vehicle control device that can reduce the anxiety of the occupants.

DETAILED DESCRIPTION

Hereinafter, embodiments of the present invention will be described with reference to the drawings.

Figure 1:
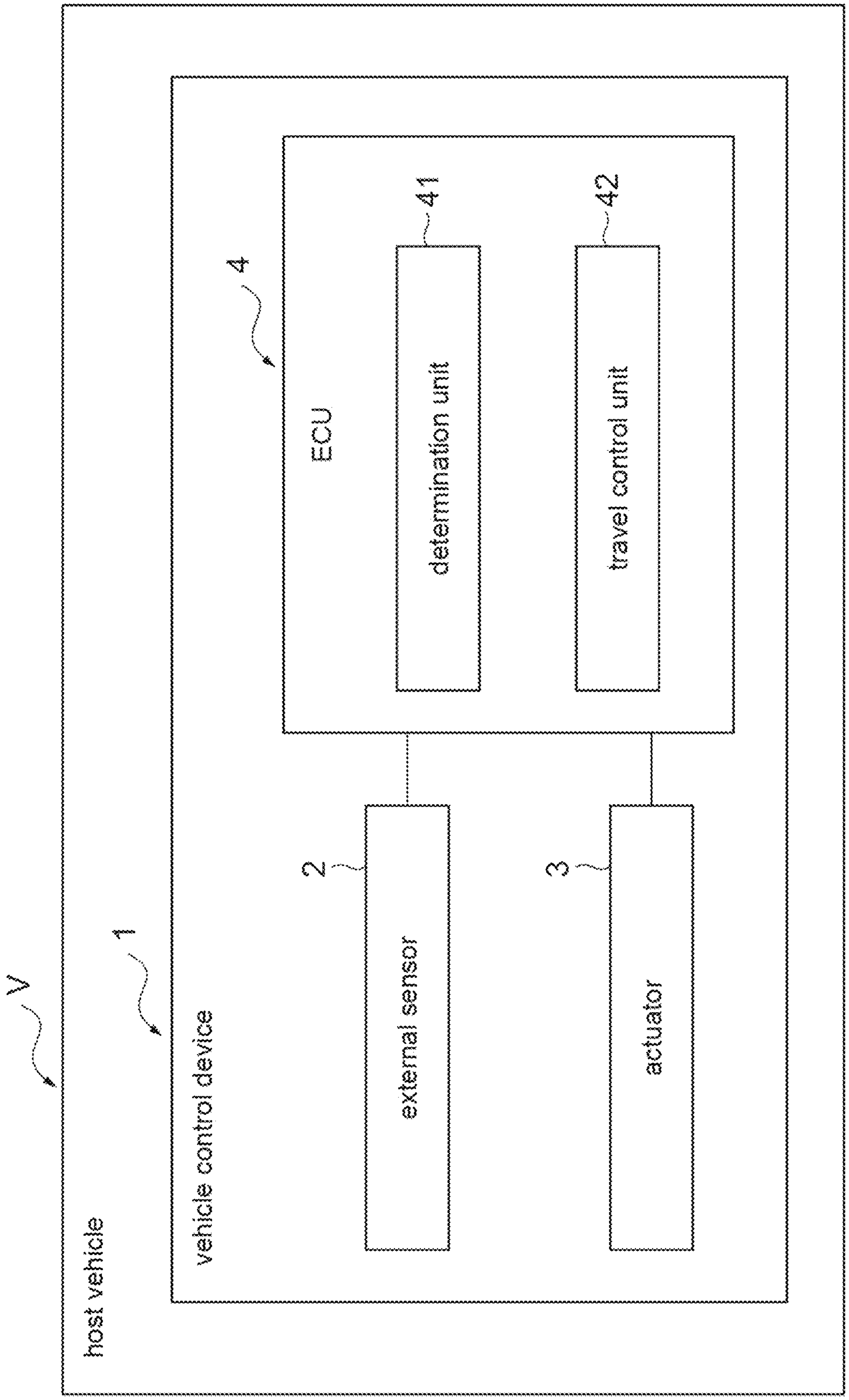
FIG. 1 is a block diagram showing the configuration of a vehicle control device according to one embodiment.

As shown in FIG. 1, the vehicle control device 1 according to this embodiment is a device that controls the lateral position of the host vehicle V in an own lane in which the host vehicle V travels. The vehicle control device 1 is mounted on the host vehicle V. The host vehicle V may be a passenger car or a freight vehicle. The host vehicle V can accommodate one or more occupants. The host vehicle V may be a vehicle capable of manual driving by the driver or an autonomous driving vehicle capable of autonomous driving [Autonomous Driving].

The control implemented by the vehicle control device 1 may include, for example, control by at least one of Cruise Control [CC], Adaptive Cruise Control [ACC], Lane Tracing Assist, Lane Keep Control, Lane Change Assistance, and Overtaking Assistance.

The vehicle control device 1 includes an external sensor 2, an actuator 3, and an Electronic Control Unit [ECU] 4. The external sensor 2 is a sensor that acquire the surrounding environment of the host vehicle V. The external sensor 2 may include at least one of a camera, millimeter-wave radar, and LIDAR [Light Detection and Ranging]. The actuator 3 is a controller for controlling the speed of the host vehicle V. The actuator 3 may include, for example, an actuator that controls the output of an engine or motor, and a brake actuator.

The ECU 4 is an electronic control unit that has a Central Processing Unit [CPU], Read Only Memory [ROM], Random Access Memory [RAM], etc. The ECU 4, for example, loads a program recorded in the ROM into the RAM and executes the program loaded in the RAM with the CPU to realize various functions. The ECU 4 may consist of multiple electronic control units. Functionally, the ECU 4 includes a determination unit 41 and a travel control unit 42.

The determination unit 41 determines, based on the detection results of the external sensor 2, whether obstacles and traveling other vehicles exist in the adjacent lane (hereinafter simply referred to as "adjacent lane") adjacent to one side in the vehicle-width direction with respect to the own lane. The determination method of the determination unit 41 is not particularly limited, and various known methods can be used (the same applies hereinafter). The adjacent lane may be a lane with the same travel direction as the own lane or an oncoming lane with the opposite travel direction. The obstacle may be, for example, a parked vehicle. The obstacle is not particularly limited and includes fixed obstacles such as road cones as well as moving obstacles such as bicycles. The traveling other vehicle may be, for example, another vehicle that is deviating to the side of the own lane to avoid an obstacle or is about to do so.

The determination unit 41 determines the road structure on the opposite side of the adjacent lane side based on the detection results of the external sensor 2. As the road structure, for example, a pedestrian strip with only lane lines, a lane facing the entrance and exit of a building, and a sidewalk with curbs can be mentioned. The road structure is not particularly limited, and any structure related to the road is acceptable. The determination unit 41 determines whether a pedestrian or another traveling other vehicle exists on the opposite side of the adjacent lane side.

The determination unit 41 determines whether there is a blind spot in a predetermined range of the adjacent lane for the external sensor 2. The predetermined range is not particularly limited but may correspond to the detection range of the external sensor 2 (for example, 200 m). The blind spot of the external sensor 2 means, for example, a range that cannot be detected by the external sensor 2 due to at least one of the reasons originating from the external sensor 2, obstacles, and road shape. The determination unit 41 determines whether there is a blind spot in a predetermined range on the opposite side of the adjacent lane side for the external sensor 2.

The travel control unit 42 offsets the lateral position of the host vehicle V to the other side in the vehicle-width direction in the own lane when obstacles and traveling other vehicles exist in the adjacent lane. The travel control unit 42 adjusts the amount of offset (hereinafter simply referred to as "offset") to offset the lateral position of the host vehicle V to the other side in the vehicle-width direction according to the road structure on the opposite side of the adjacent lane side.

The travel control unit 42 reduces the amount of offset if the road structure on the opposite side of the adjacent lane side is a pedestrian strip with only lane lines or a lane facing the entrance and exit of a building. Reducing the amount of offset means making it smaller than the normal offset amount, which is the amount of offset for offsetting the host vehicle V under normal conditions. The normal offset amount may be, for example, a predetermined standard amount or a standard amount set based on the vehicle speed of the host vehicle V. The normal offset amount is not particularly limited. The travel control unit 42 does not reduce the amount of offset if the road structure on the opposite side of the adjacent lane side is a sidewalk with curbs.

The travel control unit 42 offsets the host vehicle V in the own lane if there is a blind spot in the predetermined range of the adjacent lane for the external sensor 2, regardless of whether traveling other vehicles exist in the adjacent lane. The travel control unit 42 does not offset the host vehicle V if there is a blind spot in the predetermined range on the opposite side of the adjacent lane side for the external sensor 2. The travel control unit 42 reduces the amount of offset for offsetting the host vehicle V if a pedestrian or another traveling other vehicle exists on the opposite side of the adjacent lane side. The travel control unit 42 realizes the offset of the host vehicle V by transmitting a control signal to the actuator 3.

Next, the offset processing for offsetting the host vehicle V by the vehicle control device 1 according to this embodiment will be described with reference to the flowcharts of FIGS. 2 and 3. The offset processing is executed, for example, while the host vehicle V is traveling. In the offset processing, if the process reaches the end, the process starts again from the start after a predetermined time.

Figure 2:
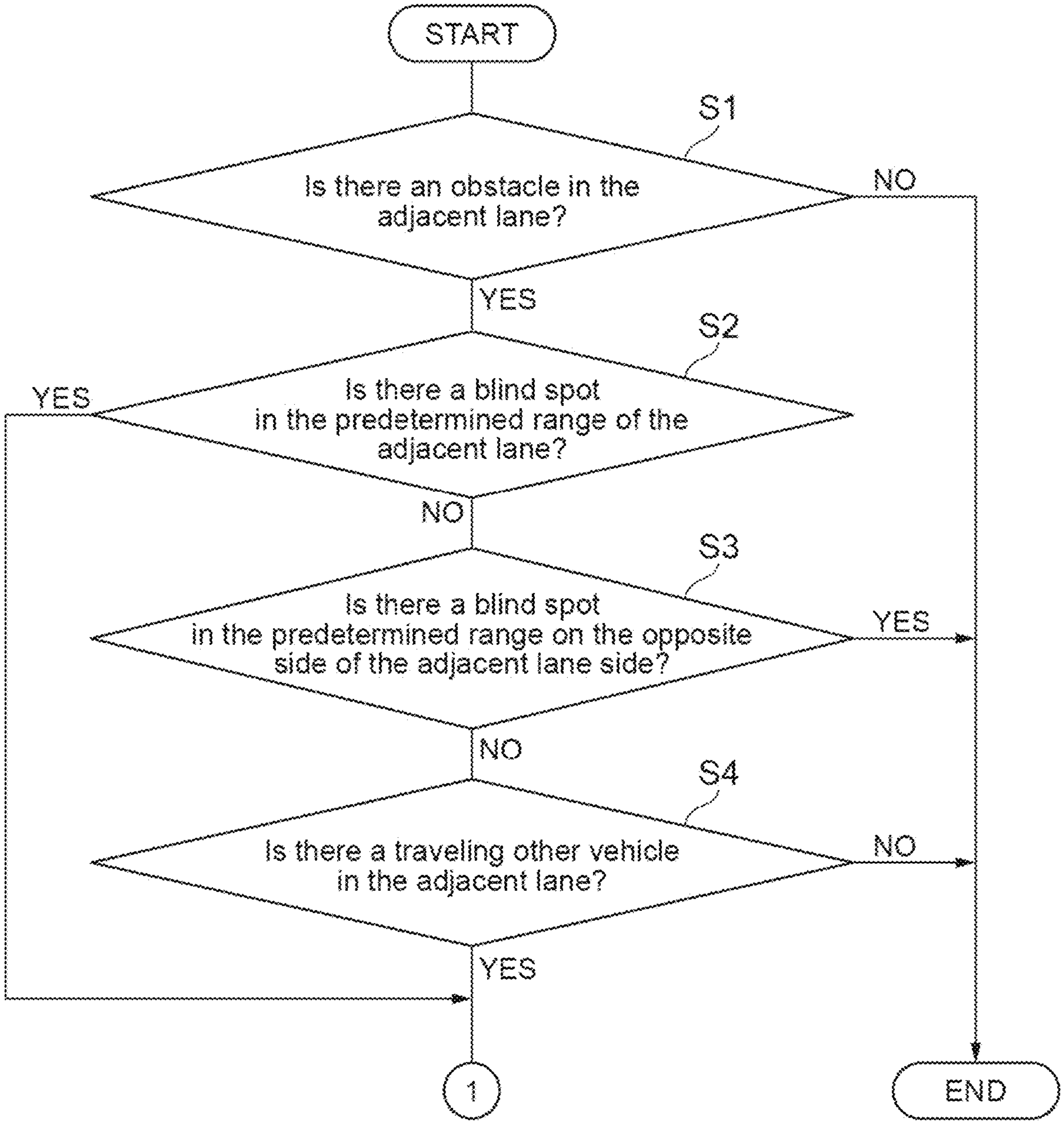
FIG. 2 is a flowchart showing an example of processing by the vehicle control device of FIG. 1.

As shown in FIG. 2, first, the determination unit 41 determines whether there is an obstacle in the adjacent lane based on the detection results of the external sensor 2 (Step S1). If YES in the above Step S1, the determination unit 41 determines whether there is a blind spot in the predetermined range of the adjacent lane for the external sensor 2 (Step S2). If NO in the above Step S2, the determination unit 41 determines whether there is a blind spot in the predetermined range on the opposite side of the adjacent lane side for the external sensor 2 (Step S3). If NO in the above Step S3, the determination unit 41 determines whether there is a traveling other vehicle in the adjacent lane based on the detection results of the external sensor 2 (Step S4). If NO in the above Step S1, YES in the above Step S3, or NO in the above Step S4, the process ends without executing the offset of the host vehicle V.

Figure 3:
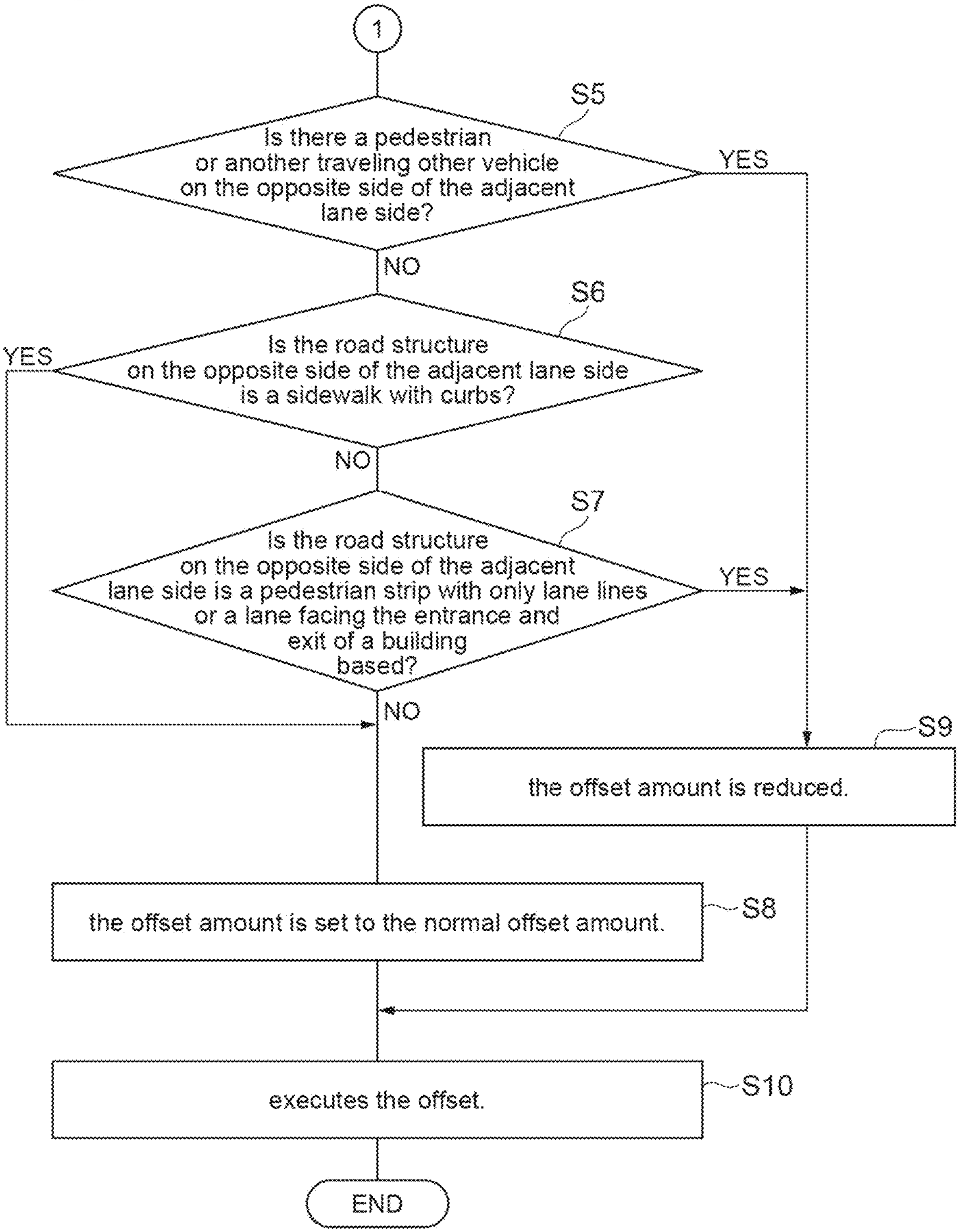
FIG. 3 is a flowchart showing the continuation of FIG. 2.

If YES in the above Step S2 or YES in the above Step S4, as shown in FIG. 3, the determination unit 41 determines whether there is a pedestrian or another traveling other vehicle on the opposite side of the adjacent lane side based on the detection results of the external sensor 2 (Step S5). If NO in the above Step S5, the determination unit 41 determines whether the road structure on the opposite side of the adjacent lane side is a sidewalk with curbs based on the detection results of the external sensor 2 (Step S6).

If NO in the above Step S6, the determination unit 41 determines whether the road structure on the opposite side of the adjacent lane side is a pedestrian strip with only lane lines or a lane facing the entrance and exit of a building based on the detection results of the external sensor 2 (Step S7). If YES in the above Step S6 or NO in the above Step S7, the offset amount is set to the normal offset amount (Step S8). On the other hand, if YES in the above Step S5 or YES in the above Step S7, the offset amount is reduced (Step S9). Then, the travel control unit 42 executes the offset of the host vehicle V with the set offset amount and ends the process (Step S10).

In the vehicle control device 1, when obstacles and traveling other vehicles exist in the adjacent lane, the host vehicle V is offset. At this time, the offset amount of the offset is adjusted according to the road structure on the opposite side of the adjacent lane side. This allows offsetting considering the road structure on the opposite side of the adjacent lane side, making it possible to suppress the anxiety of the occupants.

In the vehicle control device 1, if there is a blind spot of the external sensor 2 in the adjacent lane, the host vehicle V is offset to the opposite side of the adjacent lane side in the own lane regardless of whether traveling other vehicles exist in the adjacent lane. This allows for consideration of the blind spot in the adjacent lane and suppresses the anxiety of the occupants, taking into account the possibility that the host vehicle V, traveling other vehicles, and obstacles in the adjacent lane may line up side by side.

In the vehicle control device 1, if there is a pedestrian or another traveling other vehicle on the opposite side of the adjacent lane side, the offset amount is reduced. This allows for offsetting considering pedestrians and traveling other vehicles on the opposite side of the adjacent lane side, making it possible to suppress the anxiety of the occupants.

In the vehicle control device 1, if the road structure on the opposite side of the adjacent lane side is a pedestrian strip with only lane lines or a lane facing the entrance and exit of a building, the offset amount is reduced. If the road structure on the opposite side of the adjacent lane side is a sidewalk with curbs, the offset amount is not reduced. This allows for the realization of the above effect of suppressing the anxiety of the occupants by considering the road structure on the opposite side of the adjacent lane side.

Although the embodiments of the present invention have been described above, the present invention is not limited to the above-described embodiments. The present invention can be implemented in various forms, including the above-described embodiments, based on the knowledge of those skilled in the art.

In the above embodiment, the travel control unit 42 reduces the offset amount, but alternatively, the offset amount may be set to zero. In the above embodiment, the travel control unit 42 may offset the host vehicle V and also reduce the speed of the host vehicle V. In the above embodiment, if there is a high possibility that traveling other vehicles in the adjacent lane will jump out into the own lane, the host vehicle V may be decelerated in advance.

What is claimed is:

1. A vehicle control device comprising:

a determination unit that determines, based on the detection results of a sensor that acquires the surrounding environment of a host vehicle, whether or not an obstacle and a traveling other vehicle exists in an adjacent lane adjacent to one side in a vehicle-width direction of an own lane in which the host vehicle travels; and a travel control unit that, when it is determined by the determination unit that the obstacle and the traveling other vehicle exists in the adjacent lane, offsets a lateral position of the host vehicle in the own lane to the other side in the vehicle-width direction, wherein the travel control unit adjusts an amount of offset to offset the lateral position of the host vehicle to the other side in the vehicle-width direction according to a road structure on the opposite side of the adjacent lane side;

wherein if the road structure on the opposite side of the adjacent lane side is a pedestrian strip with only lane lines or a lane facing an entrance and/or exit of a building, the travel control unit sets the amount of offset to a reduced offset amount.

2. The vehicle control device according to claim 1, wherein the travel control unit offsets the lateral position of the host vehicle to the other side in the vehicle-width direction in the own lane regardless of whether traveling the other vehicle exists in the adjacent lane if there is a blind spot of the sensor in the adjacent lane.

3. The vehicle control device according to claim 1, wherein the travel control unit reduces or sets to zero the amount of offset to offset the lateral position of the host vehicle to the other side in the vehicle-width direction if a pedestrian or an another traveling other vehicle exists on the opposite side of the adjacent lane side.

4. The vehicle control device according to claim 1, wherein the travel control unit does not reduce the amount of offset if the road structure on the opposite side of the adjacent lane side is a sidewalk with curbs.

5. A vehicle control device comprising:

a determination unit that determines, based on the detection results of a sensor that acquires the surrounding environment of a host vehicle, whether or not an obstacle and a traveling other vehicle exists in an adjacent lane adjacent to one side in a vehicle-width direction of an own lane in which the host vehicle travels; and a travel control unit that, when it is determined by the determination unit that the obstacle and the traveling other vehicle exists in the adjacent lane, offsets a lateral position of the host vehicle in the own lane to the other side in the vehicle-width direction, wherein the travel control unit adjusts an amount of offset to offset the lateral position of the host vehicle to the other side in the vehicle-width direction according to a road structure on the opposite side of the adjacent lane side; and wherein if the road structure on the opposite side of the adjacent lane side is a sidewalk with curbs, the travel control unit sets the amount of offset to a normal offset amount.

6. The vehicle control device according to claim 5, wherein the travel control unit offsets the lateral position of the host vehicle to the other side in the vehicle-width direction in the own lane regardless of whether traveling the other vehicle exists in the adjacent lane if there is a blind spot of the sensor in the adjacent lane.

7. The vehicle control device according to claim 5, wherein the travel control unit reduces or sets to zero the amount of offset to offset the lateral position of the host vehicle to the other side in the vehicle-width direction if a pedestrian or an another traveling other vehicle exists on the opposite side of the adjacent lane side.

* * * * *